US012519384B2

(12) United States Patent
Saeki

(10) Patent No.: US 12,519,384 B2
(45) Date of Patent: Jan. 6, 2026

(54) DEVICE AND METHOD FOR SUPPLYING LOGIC SUPPLY VOLTAGE IN MIXED SIGNAL CiRCUIT

(71) Applicant: Synaptics Incorporated, San Jose, CA (US)

(72) Inventor: Yutaka Saeki, Kanagawa (JP)

(73) Assignee: Synaptics Incorporated, San Jose, CA (US)

( * ) Notice: Subject to any disclaimer, the term of this patent is extended or adjusted under 35 U.S.C. 154(b) by 206 days.

(21) Appl. No.: 18/542,932

(22) Filed: Dec. 18, 2023

(65) Prior Publication Data

US 2025/0202337 A1 Jun. 19, 2025

(51) Int. Cl.
*H02M 3/155* (2006.01)
*H02M 1/00* (2006.01)

(52) U.S. Cl.
CPC ......... *H02M 1/0067* (2021.05); *H02M 3/155* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; G05F 1/465; G05F 1/468; G05F 1/562; G05F 1/565; G05F 1/567; G05F 1/569; G05F 1/571; G05F 1/573; G05F 1/5735; H02M 5/2573; H02M 1/081; H02M 5/293; H02M 7/12; H02M 3/10; H02M 3/125; H02M 3/13; H02M 3/135; H02M 3/145; H02M 3/15; H02M 3/155;
(Continued)

(56) References Cited

U.S. PATENT DOCUMENTS 6,066,977 A * 5/2000 Felton ............ H03K 19/018585 327/390
6,335,893 B1 * 1/2002 Tanaka .................. G11C 5/147 257/E27.097

(Continued)

*Primary Examiner* — Sean Kayes
*Assistant Examiner* — Nusrat Quddus
(74) *Attorney, Agent, or Firm* — Leydig, Voit & Mayer, Ltd.

(57) ABSTRACT

A mixed signal circuit includes a logic circuit, an analog circuit, a logic supply line, a first regulator circuit, and a second regulator circuit. The analog circuit is configured to receive an analog supply voltage. The logic supply line is coupled to the logic circuit. The first regulator circuit includes an output p-channel metal oxide semiconductor (PMOS) transistor having a drain coupled to the logic supply line and a first former stage configured to receive a first logic supply voltage to drive a gate of the output PMOS transistor. The second regulator circuit includes an output n-channel metal oxide semiconductor (NMOS) transistor having a source coupled to the logic supply line and a second former stage configured to receive the analog supply voltage to drive a gate of the output NMOS transistor. The analog supply voltage is higher than the first logic supply voltage.

20 Claims, 11 Drawing Sheets

(58) Field of Classification Search
CPC .... H02M 3/156; H02M 3/158; H02M 3/1588; H02M 2003/1566; H02M 3/1582; H02M 2003/1557; H05B 39/048; B23K 11/24; H04B 2215/069
See application file for complete search history.

(56) References Cited

U.S. PATENT DOCUMENTS

| | | | | |
|---|---|---|---|---|
| 7,868,605 | B1 * | 1/2011 | Liu | G11C 5/147<br>323/284 |
| 10,707,872 | B1 * | 7/2020 | Enache | H03K 19/018521 |
| 11,798,480 | B2 * | 10/2023 | Han | G09G 3/3258 |
| 11,847,982 | B1 * | 12/2023 | Yang | G09G 3/3406 |
| 12,223,878 | B2 * | 2/2025 | Yun | H02M 3/07 |
| 2006/0066354 | A1 * | 3/2006 | Isik | H03K 19/018521<br>326/86 |
| 2009/0296497 | A1 * | 12/2009 | Hirabayashi | G11C 5/14<br>365/189.11 |
| 2011/0080433 | A1 * | 4/2011 | Park | G09G 3/3233<br>345/212 |
| 2013/0015832 | A1 * | 1/2013 | Yoon | G05F 1/575<br>323/299 |
| 2016/0054747 | A1 * | 2/2016 | Cohen | H02M 3/07<br>713/300 |
| 2016/0147240 | A1 * | 5/2016 | Lan | G05F 1/565<br>323/280 |
| 2017/0353188 | A1 * | 12/2017 | Saeki | H03F 3/301 |
| 2018/0109255 | A1 * | 4/2018 | Lee | H03K 19/017509 |
| 2022/0311397 | A1 * | 9/2022 | Koh | H03F 3/45269 |

* cited by examiner

DEVICE AND METHOD FOR SUPPLYING LOGIC SUPPLY VOLTAGE IN MIXED SIGNAL CiRCUIT

TECHNICAL FIELD

This disclosure relates generally to mixed signal circuits, and more particularly, to devices and methods for providing a supply voltage to a logic circuit within a mixed signal circuit.

BACKGROUND

Mixed signal circuits, which include both an analog circuit and a logic (or digital) circuit, are widely used in electronic devices. A mixed signal circuit may include a power supply circuit configured to generate a logic supply voltage from an external supply voltage received from an external power source, and to provide the logic supply voltage to the logic circuit. In implementations where the external supply voltage is low, such as 1.8V or less, the power supply circuit may use a low dropout (LDO) voltage regulator to generate the logic supply voltage. However, a reduction in the external supply voltage may cause an undesired drop in the logic supply voltage when the logic circuit is consuming high power or high current. Accordingly, there is a need to provide a technology that enables the power supply circuit to suppress or avoid the logic supply voltage drop even when the logic circuit is consuming high power or high current.

SUMMARY

This summary is provided to introduce, in a simplified form, a selection of concepts that are further described below. This summary is not necessarily intended to identify key features or essential features of the present disclosure. The present disclosure may include the following various aspects and embodiments.

In an exemplary embodiment, the present disclosure provides a mixed signal circuit that includes a logic circuit, an analog circuit, a logic supply line, a first regulator circuit, and a second regulator circuit. The analog circuit is configured to receive an analog supply voltage. The logic supply line is coupled to the logic circuit. The first regulator circuit includes an output p-channel metal oxide semiconductor (PMOS) transistor having a drain coupled to the logic supply line and a first former stage configured to receive a first logic supply voltage to drive a gate of the output PMOS transistor. The second regulator circuit includes an output n-channel metal oxide semiconductor (NMOS) transistor having a source coupled to the logic supply line and a second former stage configured to receive the analog supply voltage to drive a gate of the output NMOS transistor. The analog supply voltage is higher than the first logic supply voltage.

In another exemplary embodiment, the present disclosure provides a system that includes a power management circuit and a mixed signal circuit. The power management circuit is configured to generate a first logic supply voltage and an analog supply voltage higher than the first logic supply voltage. The mixed signal circuit includes a logic circuit, an analog circuit, a logic supply line, a first regulator circuit, and a second regulator circuit. The analog circuit is configured to receive the analog supply voltage. The logic supply line is coupled to the logic circuit. The first regulator circuit includes an output PMOS transistor having a drain coupled to the logic supply line and a first former stage configured to receive the first logic supply voltage to drive a gate of the output PMOS transistor. The second regulator circuit includes an output NMOS transistor having a source coupled to the logic supply line and a second former stage configured to receive the analog supply voltage to drive a gate of the output NMOS transistor.

In yet another exemplary embodiment, the present disclosure provides a method. The method includes providing a first logic supply voltage to a first former stage of a first regulator circuit. The first regulator circuit includes an output p-channel metal oxide semiconductor (PMOS) transistor having a drain coupled to a logic supply line coupled to a logic circuit. The method further includes driving, by the first former stage, a gate of the output PMOS transistor to cause the output PMOS transistor to drive the logic supply line. The method further includes providing an analog supply voltage to an analog circuit. The analog supply voltage is higher than the first logic supply voltage. The method further includes providing the analog supply voltage to a second former stage of a second regulator circuit. The second regulator circuit includes an output n-channel metal oxide semiconductor (NMOS) transistor having a source coupled to the logic supply line. The method further includes driving a gate of the output NMOS transistor by the second former stage to cause the output NMOS transistor to drive the logic supply line.

Other features and aspects are described in further detail below with reference to the attached drawings.

Figure 1:
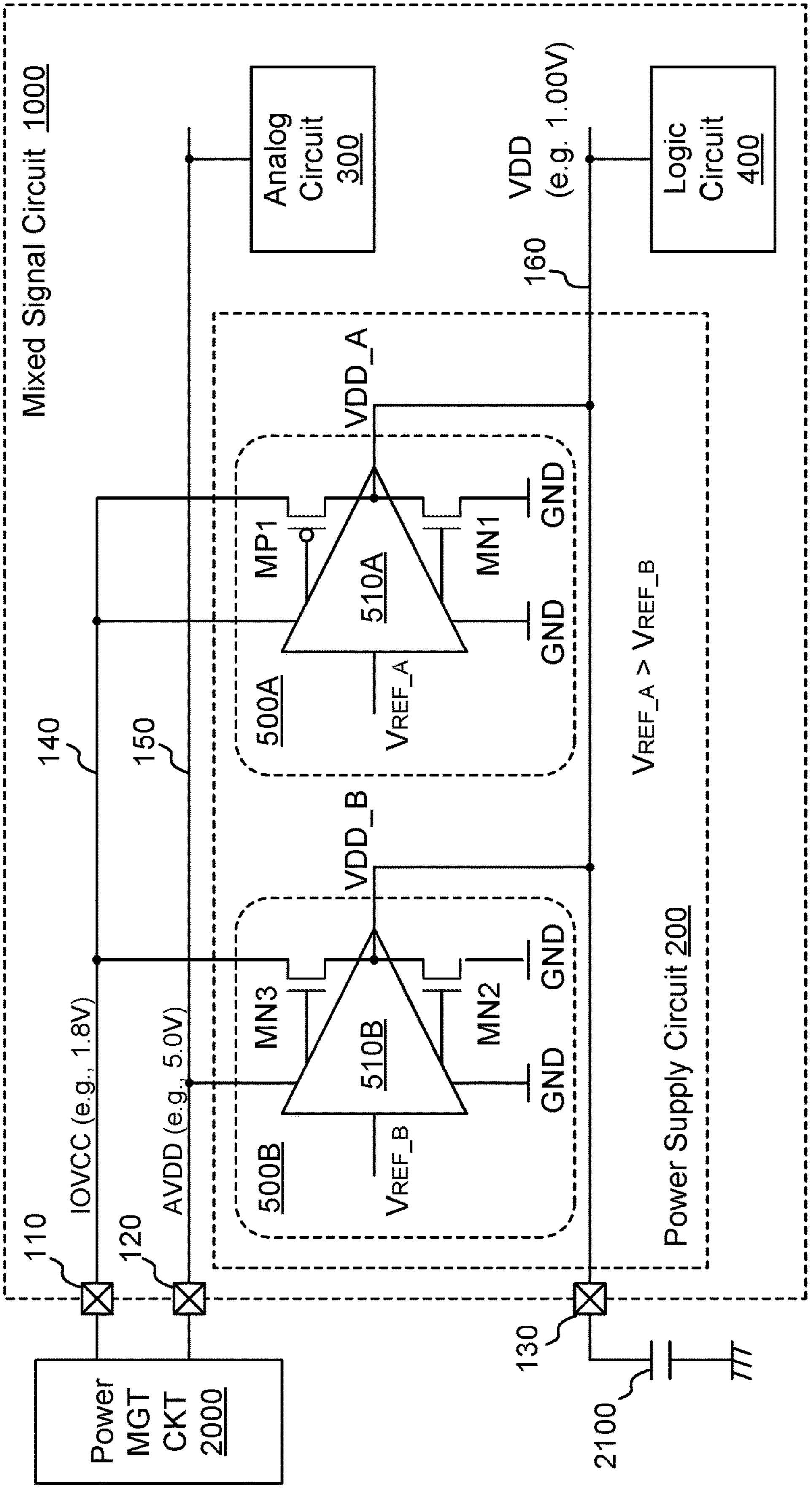
FIG. 1 is a block diagram showing an example system that includes a mixed signal circuit and a power management circuit, according to one or more embodiments.

For ease of understanding, where possible, identical reference numerals have been used to designate elements that are common to the figures. It is contemplated that elements disclosed in one embodiment may be utilized in other embodiments without specific recitation. Suffixes may be appended to reference numerals to distinguish elements from one another. The drawings referenced herein are not be to be construed as being drawn to scale unless specifically noted. In addition, the drawings are often simplified and details or components are omitted for clarity of presentation and explanation. The drawings and discussion serve to explain principles discussed below.

DETAILED DESCRIPTION

The following detailed description is exemplary in nature and is not intended to limit the disclosure or the applications and uses of the disclosure. Further there is no intention to be bound by any expressed or implied theory presented in the preceding background, summary and brief description of the drawings, or in the following detailed description.

In the following detailed description, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

The term "coupled" as used herein means connected directly to or connected through one or more intervening components or circuits. Further, throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Mixed signal circuits, which include both an analog circuit and a logic (or digital) circuit, are widely used in electronic devices. One example of a mixed signal circuit is a display driver configured to drive a display panel, such as a liquid crystal display (LCD) panel, an organic light emitting diode (OLED) display panel, or a micro light emitting diode (μLED) display panel. A display driver may include a data driver circuit, which is an analog circuit that drives data lines (or also referred to as source lines) of a display panel, and various logic circuits such as a timing controller, an image processing circuit, and so on.

A mixed signal circuit may include therein a power supply circuit configured to generate a logic supply voltage from an external supply voltage received from an external power source and to provide the logic supply voltage to the logic circuit integrated within the mixed signal circuit. This is because providing the logic supply voltage directly from the external power supply to the logic circuit in the mixed signal circuit may cause a significant voltage drop across the supply line that provides the logic supply voltage from the external power source to the mixed signal circuit. The voltage drop across the supply line may make it difficult to regulate the logic supply voltage provided to the logic circuit within a desired voltage range.

Due to the specifications of recent integrated circuits such as lower power consumption and smaller transistor sizes, the external supply voltage provided to a mixed signal circuit to generate the logic supply voltage may be low, such as 1.8 V or less. A reduced external supply voltage may result in insufficient current drive capability of the power supply circuit within the mixed signal circuit, which may result in an undesirable drop in the logic supply voltage when the logic circuit consumes high power or high current. Accordingly, there is a need to provide a technology that suppresses or avoids a logic supply voltage drop even when the external supply voltage provided to the mixed signal circuit is low.

The present disclosure presents various embodiments that achieve a high current drive capability of a power supply circuit that powers a logic circuit within a mixed signal circuit, even when an external supply voltage provided to the mixed signal circuit for generating the logic supply voltage is low. In certain embodiments, a mixed signal circuit includes a logic circuit, an analog circuit, a logic supply line coupled to the logic circuit, a first regulator circuit, and a second regulator circuit. The analog circuit is configured to receive an analog supply voltage. The first regulator circuit includes an output p-channel metal oxide semiconductor (PMOS) transistor having a drain coupled to the logic supply line and a first former stage configured to receive a first logic supply voltage to drive a gate of the output PMOS transistor. The second regulator circuit includes an output n-channel metal oxide semiconductor (NMOS) transistor having a source coupled to the logic supply line and a second former stage configured to receive the analog supply voltage to drive a gate of the output NMOS transistor. The analog supply voltage is higher than the first logic supply voltage. The use of the second regulator circuit facilitates providing sufficient current drive capability to drive the logic supply line, thereby effectively suppressing or avoiding a logic supply voltage drop. Detailed embodiments of the present disclosure are described below.

FIG. 1 is a block diagram showing an example configuration of a system that includes a mixed signal circuit 1000 and a power management circuit (Power MGT CKT) 2000, according to one or more embodiments. The power management circuit 2000 is configured to provide a logic supply voltage IOVCC and an analog supply voltage AVDD to the mixed signal circuit 1000. The analog supply voltage AVDD is higher than the logic supply voltage IOVCC. In one implementation, the typical value of the logic supply voltage IOVCC is 1.8V and the typical value of the analog supply voltage AVDD is 5.0V. In other implementations, the logic supply voltage IOVCC and the analog supply voltage AVDD may have different voltage levels. The power management circuit 2000 may be configured as a power management integrated circuit (PMIC) that monolithically integrates circuitry that generates the logic supply voltage IOVCC, and circuitry that generates the analog supply voltage AVDD in a single semiconductor chip.

The mixed signal circuit 1000 is configured to receive the logic supply voltage IOVCC on an IOVCC terminal 110 and the analog supply voltage AVDD on an AVDD terminal 120. In the shown embodiment, the mixed signal circuit 1000 includes an IOVCC line 140, an AVDD line 150, a logic supply line 160, a power supply circuit 200, an analog circuit 300, and a logic circuit 400. In one implementation, the mixed signal circuit 1000 may be configured as a mixed signal integrated circuit (IC) that monolithically integrates the IOVCC line 140, the AVDD line 150, the logic supply line 160, the power supply circuit 200, the analog circuit 300, and the logic circuit 400 in a single semiconductor chip. The IOVCC line 140 is configured to provide the logic supply voltage IOVCC from the IOVCC terminal 110 to the power supply circuit 200 and the AVDD line 150 is configured to provide the analog supply voltage AVDD to the analog circuit 300.

In some embodiments, the mixed signal circuit 1000 may be configured as a display driver configured to drive a display panel, such as a liquid crystal display (LCD) panel, an organic light emitting diode (OLED) display panel, a micro light emitting diode (μLED) display panel, or other type of display panel. In such an embodiment, the analog circuit 300 may include a data driver circuit configured to drive data lines (or also referred to as source lines) of the display panel, and the logic circuit 400 may include an image processing circuit configured to provide processed image data to the data driver circuit and a timing controller configured to control the operation timing of the display driver.

The power supply circuit 200 is configured to generate an internal logic supply voltage VDD from the logic supply voltage IOVCC and to provide the internal logic supply voltage VDD to the logic circuit 400 via the logic supply line 160. The logic supply line 160 may be coupled to a VDD terminal 130 that may be coupled to the system ground via an external power line capacitor 2100. The internal logic supply voltage VDD is lower than the logic supply voltage IOVCC. In one implementation, the typical value of the internal logic supply voltage VDD is 1.00V. The typical value of the internal logic supply voltage VDD may be a different value. The power supply circuit 200 is configured to regulate the internal logic supply voltage VDD such that the internal logic supply voltage VDD falls within a specified voltage range defined in the vicinity of the typical value of the internal logic supply voltage VDD. In one implementation, the power supply circuit 200 may be configured to regulate the internal logic supply voltage VDD to fall within a voltage range, for example, between the typical value minus 0.10 V and the typical value plus 0.10 V.

In one or more embodiments, the power supply circuit 200 includes a first regulator circuit 500A and a second regulator circuit 500B which have outputs commonly coupled to the logic supply line 160. The first regulator circuit 500A and the second regulator circuit 500B are used to drive the logic supply line 160.

The first regulator circuit 500A includes a first former stage 510A, an output PMOS transistor MP1, and an output NMOS transistor MN1. The output PMOS transistor MP1 and the output NMOS transistor MN1 form an output stage that drives the output of the first regulator circuit 500A. The output PMOS transistor MP1 has a source coupled to the IOVCC line 140 and a drain coupled to the output of the first regulator circuit 500A. The output NMOS transistor MN1 has a source coupled to the ground and a drain coupled to the output of the first regulator circuit 500A. The output PMOS transistor MP1 is a pull-up transistor used to pull up the output of the first regulator circuit 500A and the output NMOS transistor MN1 is a pull-down transistor used to pull down the output of the first regulator circuit 500A. The output of the first regulator circuit 500A is coupled to the logic supply line 160.

The first former stage 510A is configured to receive the logic supply voltage IOVCC to drive the gates of the output PMOS transistor MP1 and the output NMOS transistor MN1. In one implementation, the first former stage 510A may be configured to receive a reference voltage $V_{REF\_A}$ at the input thereof and adjust the gate voltages of the output PMOS transistor MP1 and the output NMOS transistor MN1 to reduce the difference between the reference voltage $V_{REF\_A}$ and the output voltage VDD_A of the first regulator circuit 500A. In one implementation, the reference voltage $V_{REF\_A}$ may be set to be slightly lower than the upper limit of the specified voltage range of the internal logic supply voltage VDD. In embodiments where the upper limit of the specified voltage range of the internal logic supply voltage VDD is 1.10V, for example, the reference voltage $V_{REF\_A}$ may be set to 1.09V.

The second regulator circuit 500B includes a second former stage 510B and a pair of output NMOS transistors MN2 and MN3. The output NMOS transistors MN2 and MN3 form an output stage that drives the output of the second regulator circuit 500B. The output NMOS transistor MN3 has a source coupled to the output of the second regulator circuit 500B and a drain coupled to the IOVCC line 140. The output NMOS transistor MN2 has a source coupled to the ground and a drain coupled to the output of the second regulator circuit 500B. The output NMOS transistor MN3 is a pull-up transistor used to pull up the output of the second regulator circuit 500B and the output NMOS transistor MN2 is a pull-down transistor used to pull down the output of the second regulator circuit 500B.

The second former stage 510B is configured to receive the analog supply voltage AVDD to drive the gates of the output NMOS transistors MN2 and MN3. As discussed later in detail, powering the second former stage 510B by the analog supply voltage AVDD, which is higher than the logic supply voltage IOVCC, may effectively improve the current drive capability of the second regulator circuit 500B. In one implementation, the second former stage 510B may be configured to receive a reference voltage $V_{REF\_B}$ at the input thereof and adjust the gate voltages of the output NMOS transistors MN2 and MN3 to reduce the difference between the reference voltage $V_{REF\_B}$ and the output voltage VDD_B of the second regulator circuit 500B.

Figure 2:
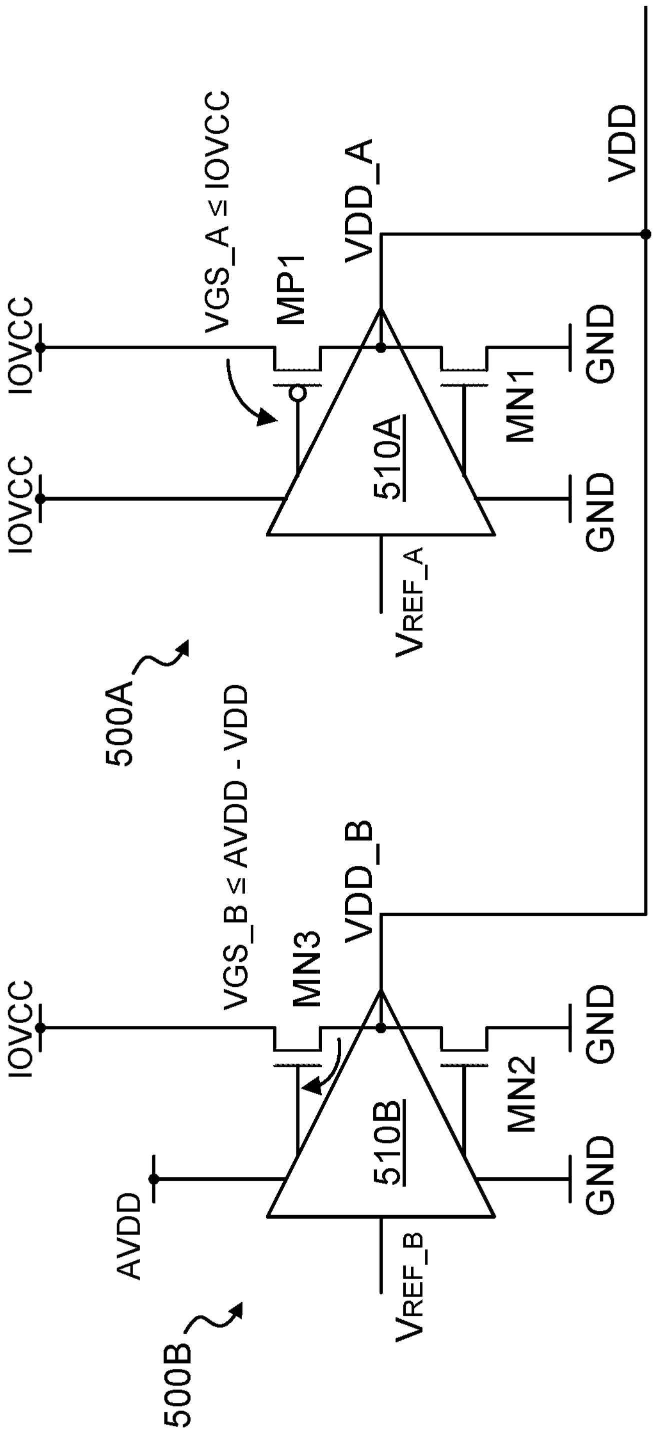
FIG. 2 shows an example gate-source voltage of an output PMOS transistor of a first regulator circuit and an example gate-source voltage of an output NMOS transistor of a second regulator circuit, according to one or more embodiments.

FIG. 2 shows the gate-source voltage of the output PMOS transistor MP1 of the first regulator circuit 500A and the gate-source voltage of the output NMOS transistor MN3 of the second regulator circuit 500B, according to one or more embodiments. Since the output PMOS transistor MP1 of the first regulator circuit 500A receives the logic supply voltage IOVCC at the source thereof, the maximum value of the gate-source voltage VGS_A of the output PMOS transistor MP1 is IOVCC. This means that when the logic supply voltage IOVCC is at a reduced voltage level, e.g., 1.8V, the first regulator circuit 500A may not provide a sufficient current drive capability to maintain the internal logic supply voltage VDD within the specified voltage range (e.g., 1.0±0.1V).

The second regulator circuit 500B is configured to compensate for the potential lack of current drive capability of the first regulator circuit 500A. The second regulator circuit 500B can provide sufficient current drive capability even when the logic supply voltage IOVCC is at a reduced voltage level because the second former stage 510B is powered by the analog supply voltage AVDD and therefore the maximum value of the gate-source voltage VGS_B of the output NMOS transistor MN3 is AVDD-VDD. It should be noted that the analog supply voltage is typically much higher than the logic supply voltage in a mixed signal circuit. In implementations where the typical values of the analog supply voltage AVDD and the internal logic supply voltage VDD are, for example, 5.0V and 1.0V, respectively, the maximum gate-source voltage VGS_B of the output NMOS transistor MN3 is approximately 4.0V, which allows an improved current drive capability of the second regulator circuit 500B.

Referring back to FIG. 1, powering the second former stage 510B by the analog supply voltage AVDD, which is higher than the logic supply voltage IOVCC, may cause an undesired increase in the power consumption of the power supply circuit 200. To reduce the power consumption of the power supply circuit 200, in one or more embodiments, the second regulator circuit 500B may be operated only when the first regulator circuit 500A cannot maintain the internal logic supply voltage VDD by itself, for example due to an increase in the power consumption of the logic circuit 400. This may be achieved by setting the reference voltage $V_{REF\_B}$ provided to the second former stage 510B to be slightly lower than the reference voltage $V_{REF\_A}$ provided to the first former stage 510A of the first regulator circuit 500A, thereby causing the second regulator circuit 500B to operate only when the internal logic supply voltage VDD is lower than the reference voltage $V_{REF\_B}$. In this case, the second regulator circuit 500B does not drive the internal logic supply voltage VDD when the internal logic supply voltage VDD is maintained higher than the reference voltage $V_{REF\_A}$ by the first regulator circuit 500A, which is powered by the logic supply voltage IOVCC. In embodiments where the reference voltage $V_{REF\_A}$ is 1.090V, for example, the reference voltage $V_{REF\_B}$ may be set to 1.085V. To improve the response to a voltage drop in the internal logic supply voltage VDD, in one or more embodiments, the difference between the reference voltage $V_{REF\_A}$ and the reference voltage $V_{REF\_B}$ may be 0.01V or less.

Figure 3:
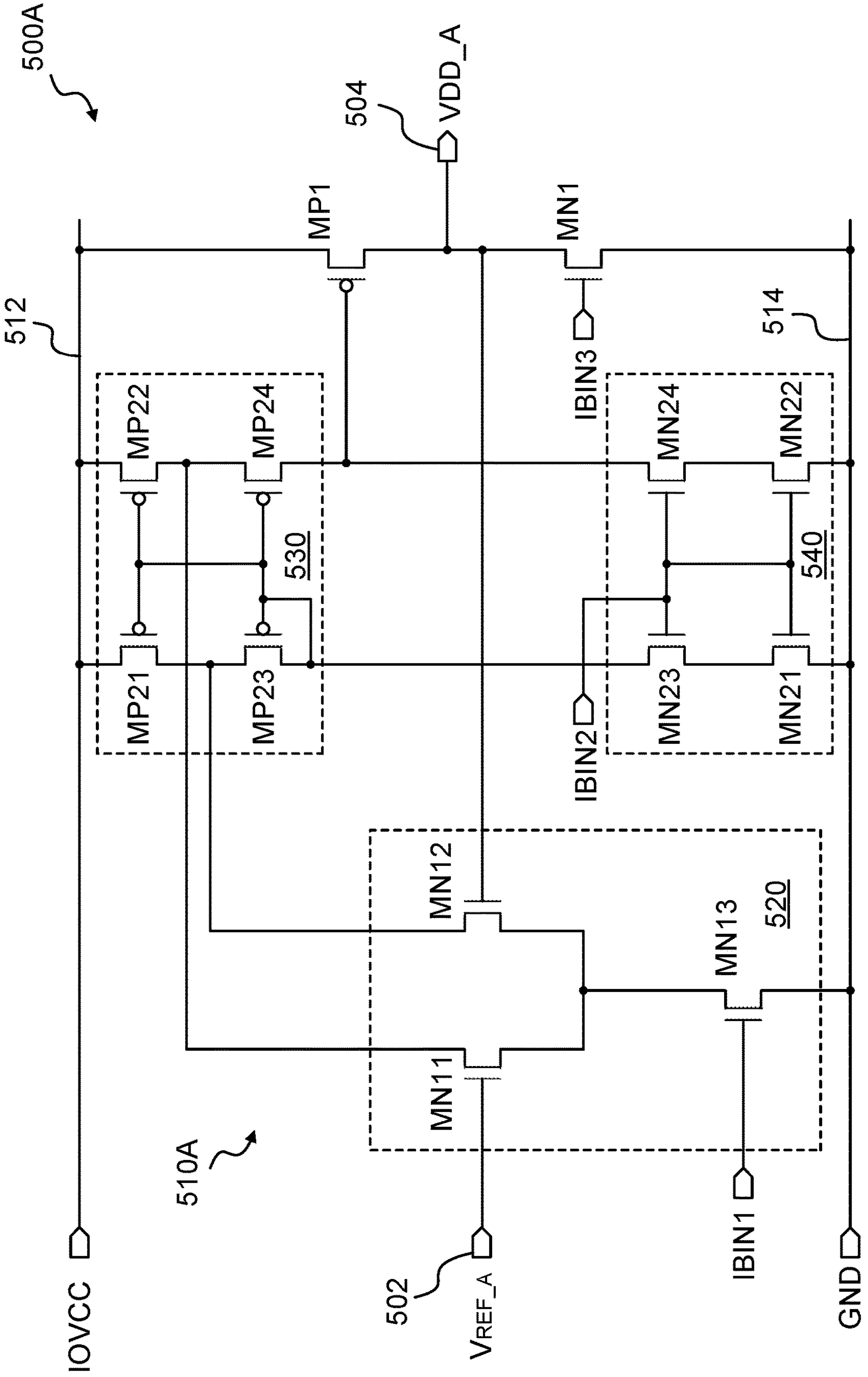
FIG. 3 shows an example circuit configuration of a first regulator circuit, according to one or more embodiments.

FIG. 3 shows an example circuit configuration of the first former stage 510A of the first regulator circuit 500A, according to one or more embodiments. In the shown embodiment, the gate of the output NMOS transistor MN1, which operates as a pull-down transistor, is coupled to a constant bias voltage IBIN3, and the first former stage 510A is configured to drive the gate of the output PMOS transistor MP1. It should be understood that the circuit configuration shown in FIG. 3 is only an example and the first former stage 510A may be configured differently from that shown in FIG. 3. In the shown embodiment, the first former stage 510A includes an input differential stage 520 and current mirrors 530 and 540.

The input differential stage 520 is configured to draw a pair of currents from the current mirror 530 depending on whether the output voltage VDD_A generated at the output 504 of the first regulator circuit 500A is higher or lower than the reference voltage $V_{REF\_A}$. In the shown embodiment, the input differential stage 520 includes NMOS transistors MN11, MN12, and MN13. The NMOS transistor MN11 has a gate coupled to the input 502 of the first regulator circuit 500A to receive the reference voltage $V_{REF\_A}$, and the NMOS transistor MN12 has a gate coupled to the output 504 of the first regulator circuit 500A. The sources of the NMOS transistors MN11 and MN12 are commonly coupled to the drain of the NMOS transistor MN13, which has a source coupled to a ground line 514. The NMOS transistor MN13 has a gate coupled to a constant bias voltage IBIN1 and thus operates as a constant current source configured to draw a constant current from the commonly-coupled sources of the NMOS transistors MN11 and MN12.

The current mirrors 530 and 540 are collectively configured to operate as an active load configured to generate the gate voltage of the PMOS transistor MP1 in response to the pair of currents drawn by the input differential stage 520. The current mirror 530 includes PMOS transistors MP21, MP22, MP23, and MP24. The sources of the PMOS transistors MP21 and MP22 are commonly coupled to an IOVCC line 512 which is provided with the logic supply voltage IOVCC. The drain of the PMOS transistor MP21 is coupled to the source of the PMOS transistor MP23, and the drain of the PMOS transistor MP22 is coupled to the source of the PMOS transistor MP24. The gates of the PMOS transistors MP21, MP22, MP23, and MP24 are commonly coupled to the drain of the PMOS transistor MP23. The current mirror 540 includes NMOS transistors MN21, MN22, MN23, and MN24. The sources of the NMOS transistors MN21 and MN22 are commonly coupled to the ground line 514. The drain of the NMOS transistor MN21 is coupled to the source of the NMOS transistor MN23, and the drain of the NMOS transistor MN22 is coupled to the source of the NMOS transistor MN24. The gates of the NMOS transistors MN21, MN22, MN23, and MN24 are commonly coupled to a constant bias voltage IBIN2. The gate of the PMOS transistor MP1 is coupled to the node coupling the drain of the PMOS transistor MP24 of the current mirror 530 and the drain of the NMOS transistor MN24 of the current mirror 540.

The first former stage 510A configured as shown in FIG. 3 drives the gate of the PMOS transistor MP1 so that the output voltage VDD_A generated at the output 504 is regulated to the reference voltage $V_{REF\_A}$.

Figure 4:
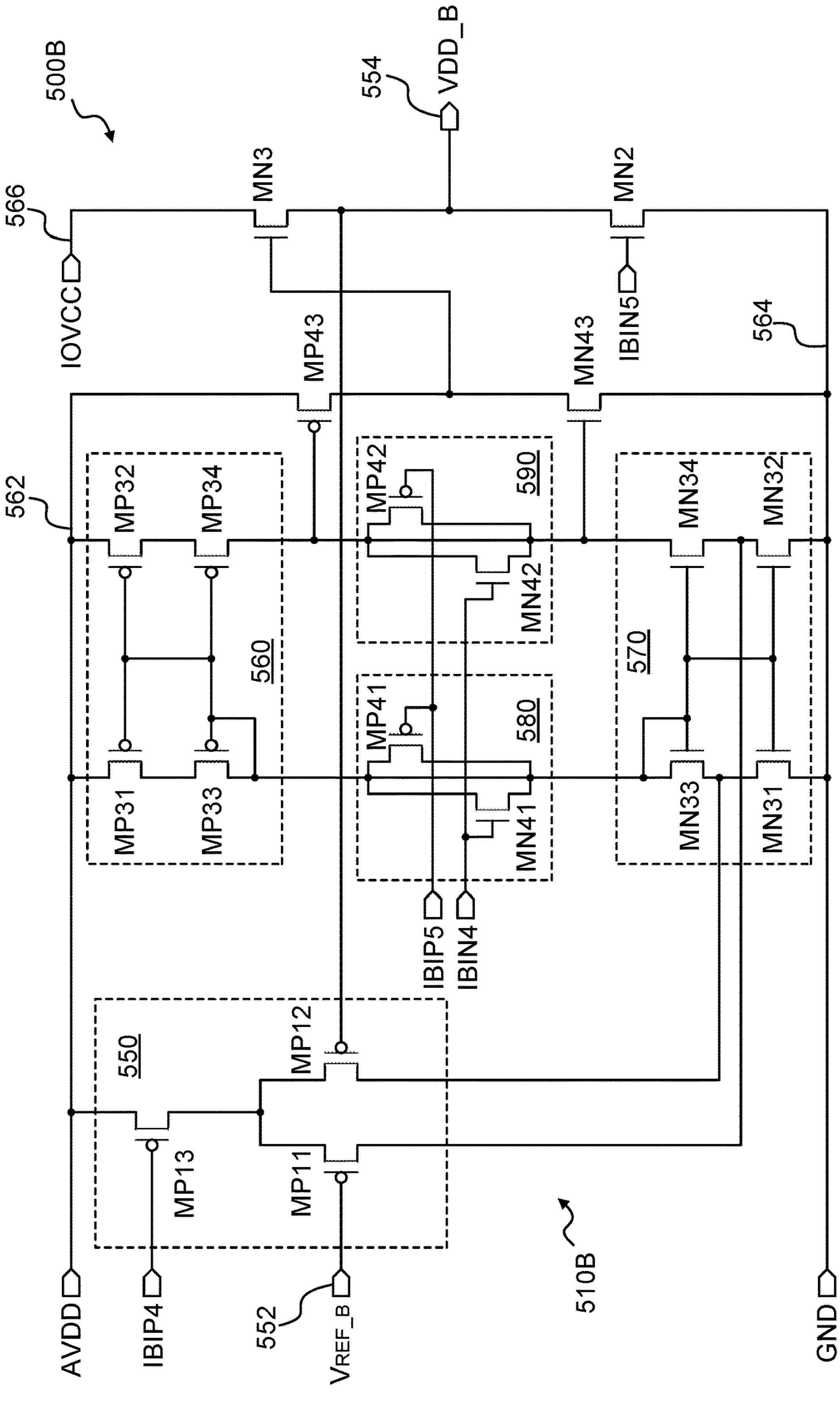
FIG. 4 shows an example circuit configuration of a second regulator circuit, according to one or more embodiments.

FIG. 4 shows an example circuit configuration of the second former stage 510B of the second regulator circuit 500B, according to one or more embodiments. In the shown embodiment, the gate of the output NMOS transistor MN2, which operates as a pull-down transistor, is coupled to a constant bias voltage IBIN5, and the second former stage 510B is configured to drive the gate of the output NMOS transistor MN3, which operates as a pull-up transistor. It should be noted that the output NMOS transistor MN3 has a drain coupled to an IOVCC line 566 to receive the logic supply voltage IOVCC. It should be understood that the circuit configuration shown in FIG. 4 is only an example and the second former stage 510B may be configured differently from that shown in FIG. 4. In the shown embodiment, the second former stage 510B includes an input differential stage 550, current mirrors 560, 570, floating current sources 580, 590, a PMOS transistor MP43, and an NMOS transistor MN43.

The input differential stage 550 is configured to provide a pair of currents to the current mirror 570 depending on whether the output voltage VDD_B generated at the output 554 of the second regulator circuit 500B is higher or lower than the reference voltage $V_{REF\_B}$. In the shown embodiment, the input differential stage 550 includes PMOS transistors MP11, MP12, and MP13. The PMOS transistor MP11 has a gate coupled to the input 552 of the second regulator circuit 500B to receive the reference voltage $V_{REF\_B}$, and the PMOS transistor MP12 has a gate coupled to the output 554 of the second regulator circuit 500B. The sources of the PMOS transistors MP11 and MP12 are commonly coupled to the drain of the PMOS transistor MP13, which has a source coupled to an AVDD line 562 to which the analog supply voltage AVDD is supplied. The PMOS transistor MP13 has a gate coupled to a constant bias voltage IBIP4 and thus operates as a constant current source configured to provide a constant current to the commonly-coupled sources of the PMOS transistors MP11 and MP12.

The current mirrors 560 and 570 and the floating current sources 580 and 590 are collectively configured to operate as an active load configured to generate the gate voltages of the PMOS transistor MP43 and the NMOS transistor MN43. The current mirror 560 includes PMOS transistors MP31, MP32, MP33, and MP34. The sources of the PMOS transistors MP31 and MP32 are commonly coupled to the AVDD line 562. The drain of the PMOS transistor MP31 is coupled to the source of the PMOS transistor MP33, and the drain of the PMOS transistor MP32 is coupled to the source of the PMOS transistor MP34. The gates of the PMOS transistors MP31, MP32, MP33, and MP34 are commonly coupled to the drain of the PMOS transistor MP33.

The current mirror 570 includes NMOS transistors MN31, MN32, MN33, and MN34. The sources of the NMOS transistors MN31 and MN32 are commonly coupled to the ground line 564. The drain of the NMOS transistor MN31 is coupled to the source of the NMOS transistor MN33, and the drain of the NMOS transistor MN32 is coupled to the source of the NMOS transistor MN34. The gates of the NMOS transistor MN31, MN32, MN33, and MN34 are commonly coupled to the drain of the NMOS transistor MN33.

The floating current source 580 includes an NMOS transistor MN41 and a PMOS transistor MP41. The NMOS transistor MN41 has a gate coupled to a constant bias voltage IBIN4, a source coupled to the drain of the PMOS transistor MP41, and a drain coupled to the source of the PMOS transistor MP41. The PMOS transistor MP41 has a gate coupled to a constant bias voltage IBIP5. The drain of the NMOS transistor MN41 and the source of the PMOS transistor MP41 are coupled to the drain of the PMOS transistor MP33 of the current mirror 560. The source of the NMOS transistor MN41 and the drain of the PMOS transistor MP41 are coupled to the drain of the NMOS transistor MN33 of the current mirror 570.

The floating current source 590 includes an NMOS transistor MN42 and a PMOS transistor MP42. The NMOS transistor MN42 has a gate coupled to the constant bias voltage IBIN4, a source coupled to the drain of the PMOS transistor MP42, and a drain coupled to the source of the PMOS transistor MP42. The PMOS transistor MP42 has a gate coupled to the constant bias voltage IBIP5. The drain of the NMOS transistor MN42 and the source of the PMOS transistor MP42 are coupled to the drain of the PMOS transistor MP34 of the current mirror 560. The source of the NMOS transistor MN42 and the drain of the PMOS transistor MP42 are coupled to the drain of the NMOS transistor MN34 of the current mirror 570.

The PMOS transistor MP43 has a source coupled to the AVDD line 562, a gate coupled to the drain of the PMOS transistor MP34 of the current mirror 560, and a drain coupled to the gate of the output NMOS transistor MN3. The NMOS transistor MN43 has a source coupled to the ground line 564, a gate coupled to the drain of the NMOS transistor MN34 of the current mirror 570, and a drain coupled to the gate of the output NMOS transistor MN3.

The second former stage 510B configured as shown in FIG. 4 drives the gate of the NMOS transistor MN3 so that the output voltage VDD_B generated at the output 554 is regulated to the reference voltage $V_{REF\_B}$.

Figure 5:
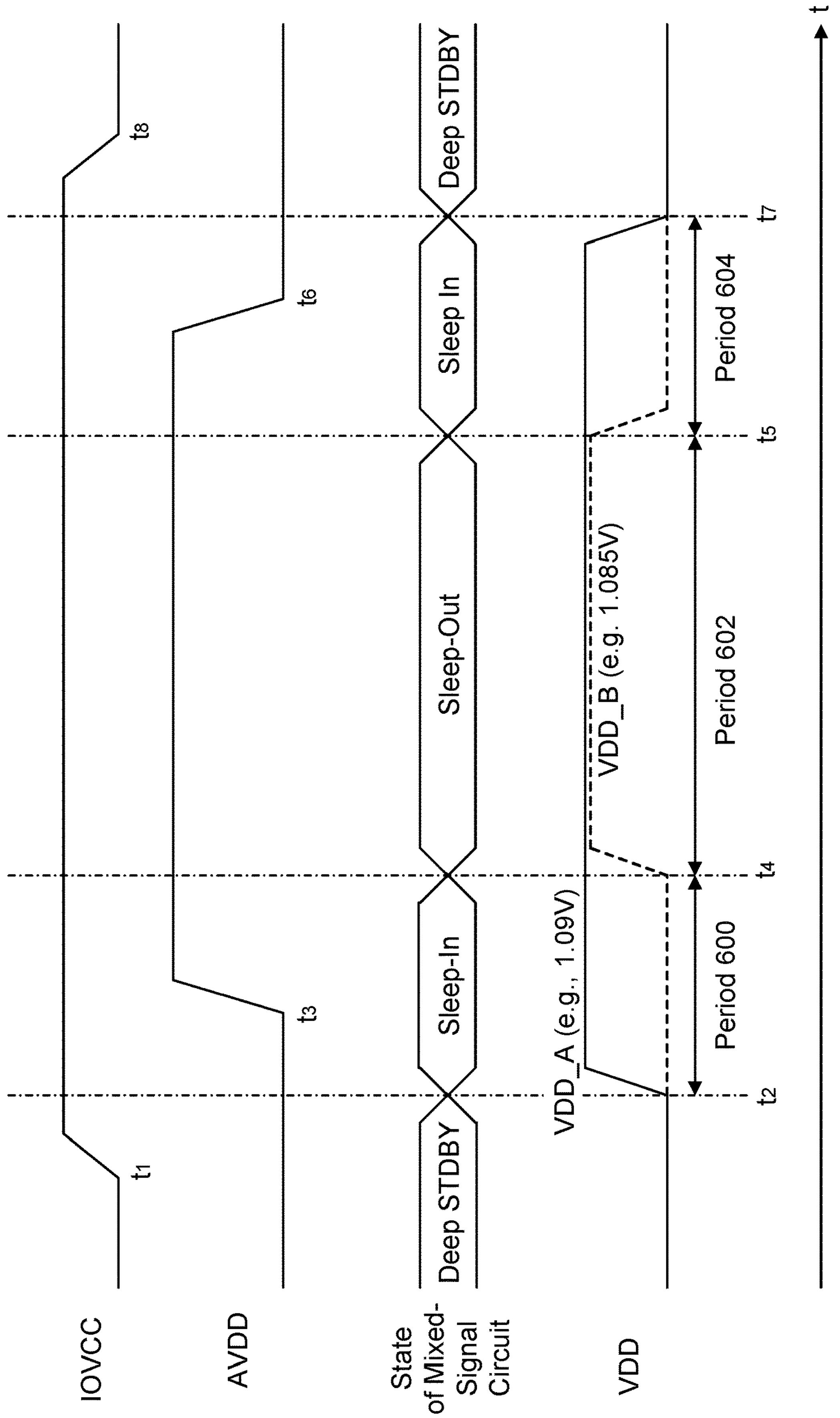
FIG. 5 shows an example of a timing diagram corresponding to operation of the system shown in FIG. 1, according to one or more embodiments.

FIG. 5 shows an example of a timing diagram corresponding to operation of the system shown in FIG. 1, according to one or more embodiments. It is noted that the horizontal axis in FIG. 5 represents time t. Initially (e.g., $t<t_1$), the mixed signal circuit 1000 is in a "deep standby (STDBY)" state. Prior to time $t_1$, the power management circuit 2000 is not operating and does not provide either the logic supply voltage IOVCC or the analog supply voltage AVDD. At time $t_1$, the power management circuit 2000 begins to drive the logic supply voltage IOVCC to the specified level (e.g., 1.8V) to provide the logic supply voltage IOVCC to the mixed signal circuit 1000.

At time $t_2$, the mixed signal circuit 1000 exits the deep standby state and enters a "sleep-in" state to perform a startup sequence. In response to the mixed signal circuit 1000 entering the sleep-in state, the first regulator circuit 500A of the power supply circuit 200 is activated and begins to drive the internal logic supply voltage VDD to the reference voltage $V_{REF\_A}$, e.g., 1.09V. It is noted that the second regulator circuit 500B remains deactivated while the mixed signal circuit 1000 is in the sleep-in state. During the period 600 during which the mixed signal circuit 1000 is in the sleep-in state, the first regulator circuit 500A of the power supply circuit 200 is kept activated and the internal logic supply voltage VDD is driven only by the first regulator circuit 500A.

In the shown embodiment, the power management circuit 2000 starts to drive the analog supply voltage AVDD to the specified level (e.g., 5.0V) at time $t_3$ after the mixed signal circuit 1000 enters the sleep-in state at time $t_2$. In alternative embodiments, the power management circuit 2000 starts to drive the analog supply voltage AVDD before the mixed signal circuit 1000 enters the sleep-in state after beginning to drive the internal logic supply voltage VDD.

At time $t_4$, the mixed signal circuit 1000 enters a "sleep-out" state in which both the analog circuit 300 and the logic circuit 400 perform normal operation. In response to the mixed signal circuit 1000 entering the sleep-out state, the second regulator circuit 500B of the power supply circuit 200 is activated to be ready to drive the internal logic supply voltage VDD to the reference voltage $V_{REF\_B}$, e.g., 1.085V. The first regulator circuit 500A and the second regulator circuit 500B are both activated during the period 602 during which the mixed signal circuit 1000 is in the sleep-out state. However, since the reference voltage $V_{REF\_B}$ provided to the second regulator circuit 500B is slightly lower than the reference voltage $V_{REF\_A}$ provided to the first regulator circuit 500A, the first regulator circuit 500A primarily drives the internal logic supply voltage VDD as long as the first regulator circuit 500A can maintain the internal logic supply voltage VDD. Meanwhile, an increase in the power or current consumption of the logic circuit 400 during normal operation may potentially cause a drop in the internal logic supply voltage VDD during the period 602. When the internal logic supply voltage VDD drops below the reference voltage $V_{REF\_B}$, the second regulator circuit 500B drives the internal logic supply voltage VDD to achieve recovery from the drop in the internal logic supply voltage VDD.

At time $t_5$, the mixed signal circuit 1000 enters the sleep-in state to perform a shutdown sequence. In response to the mixed signal circuit 1000 entering the sleep-in state, the analog circuit 300 and the second regulator circuit 500B of the power supply circuit 200 are deactivated and the second regulator circuit 500B stops driving the internal logic supply voltage VDD. It should be noted that the first regulator circuit 500A remains activated to perform the shutdown sequence while the mixed signal circuit 1000 is in the sleep-in state. At time to, the power management circuit 2000 stops driving the analog supply voltage AVDD after the mixed signal circuit 1000 enters the sleep-in state at time $t_5$.

At time $t_7$, the mixed signal circuit 1000 enters the deep standby state. In response to the mixed signal circuit 1000 entering the deep standby state, the first regulator circuit 500A of the power supply circuit 200 stops driving the internal logic supply voltage VDD. The power management circuit 2000 may then stop driving the logic supply voltage IOVCC at time $t_8$. In alternative embodiments, the power management circuit 2000 may stop driving the analog supply voltage AVDD after the mixed signal circuit 1000 enters the deep standby state.

Figure 6:
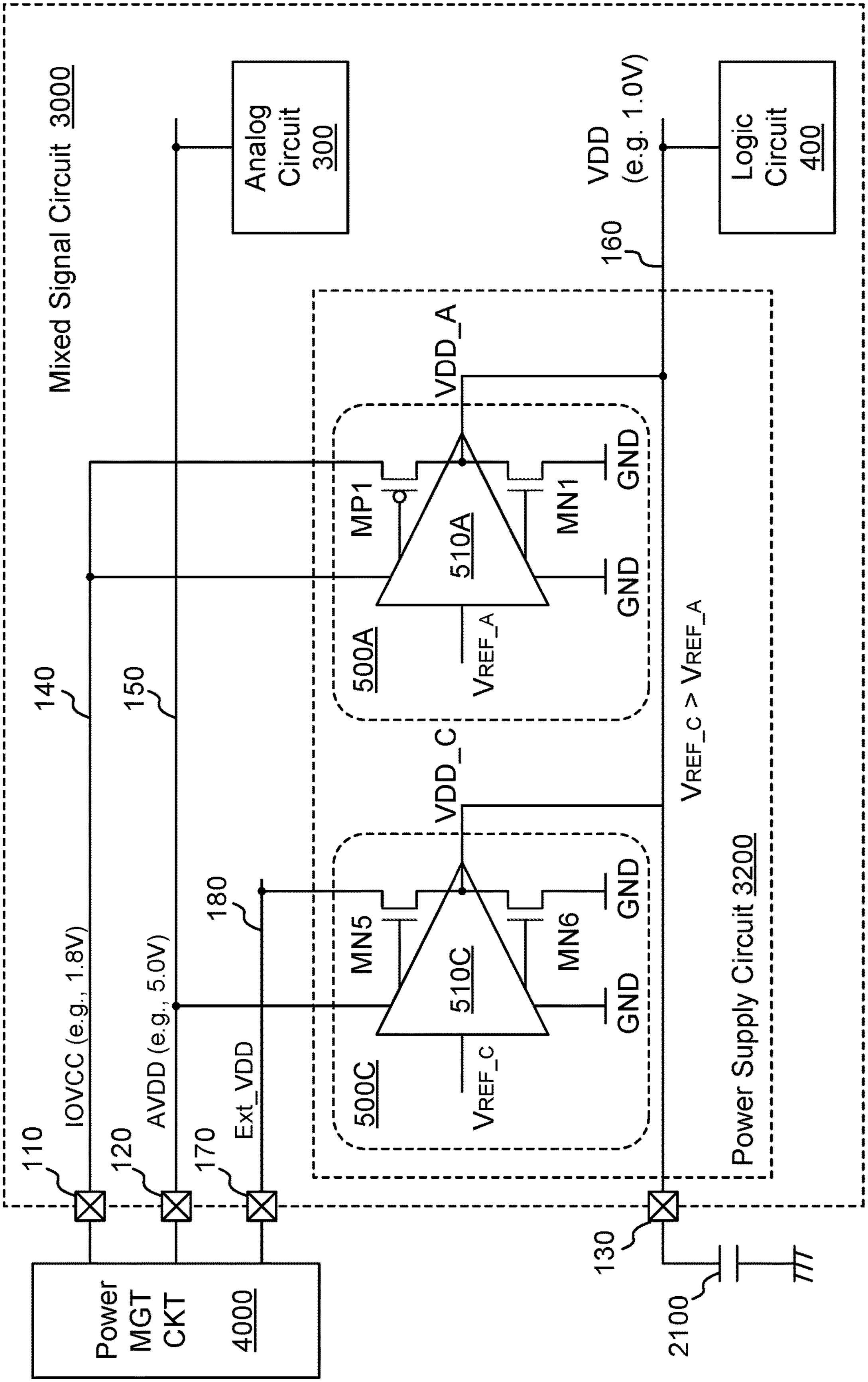
FIG. 6 is a block diagram showing an example system that includes a mixed signal circuit and a power management circuit, according to other embodiments.

FIG. 6 is a block diagram showing a system that includes a mixed signal circuit 3000 and a power management circuit 4000, according to one or more embodiments. In the shown embodiment, the power management circuit 4000 is configured to provide an external logic supply voltage Ext_VDD to the mixed signal circuit 3000 in addition to the logic supply voltage IOVCC and the analog supply voltage AVDD. The external logic supply voltage Ext_VDD is lower than the logic supply voltage IOVCC, while the analog supply voltage AVDD is higher than both of the external logic supply voltages IOVCC and Ext_VDD. The power management circuit 4000 may be configured as a power management integrated circuit (PMIC) that monolithically integrates circuitry that generates the logic supply voltage IOVCC, circuitry that generates the analog supply voltage AVDD, and circuitry that generates the external logic supply voltage Ext_VDD in a single semiconductor chip.

In some implementations, the logic supply voltage IOVCC has a voltage level consistent with a de facto display driver standard, while the external logic supply voltage Ext_VDD has a voltage level arbitrarily determined by the vendor and/or user of the system. The use of the external logic supply voltage Ext_VDD, which is lower than the logic supply voltage IOVCC, may facilitate a reduction in power consumption when providing the internal logic supply voltage VDD to the logic circuit 400. The following describes embodiments that efficiently use the external logic supply voltage Ext_VDD to provide the internal logic supply voltage VDD to the logic circuit 400.

The mixed signal circuit 3000 is configured in a manner similar to the mixed signal circuit 1000 shown in FIG. 1 except that the mixed signal circuit 3000 is configured to receive the external logic supply voltage Ext_VDD on an Ext_VDD terminal 170 and provide the internal logic supply voltage VDD to the logic circuit 400 by a power supply circuit 3200 instead of the power supply circuit 200. The external logic supply voltage Ext_VDD is provided to the power supply circuit 3200 via an Ext_VDD line 180 coupled to the Ext_VDD terminal 170. In one implementation, the mixed signal circuit 3000 may be configured as a mixed signal integrated circuit (IC) that monolithically integrates the IOVCC line 140, the AVDD line 150, the logic supply line 160, the Ext_VDD line 180, the power supply circuit 3200, the analog circuit 300, and the logic circuit 400 in a single semiconductor chip. The IOVCC line 140 is configured to provide the logic supply voltage IOVCC from the IOVCC terminal 110 to the power supply circuit 3200 and the AVDD line 150 is configured to provide the analog supply voltage AVDD to the analog circuit 300 and the power supply circuit 3200. In some embodiments, the mixed signal circuit 3000 may be configured as a display driver configured to drive a display panel such as an LCD panel, an OLED display panel, a μLED display panel or other type of display panel, as is the case with the mixed signal circuit 1000.

The power supply circuit 3200 is configured to generate the internal logic supply voltage VDD from the logic supply voltage IOVCC, the analog supply voltage AVDD, and the external logic supply voltage Ext_VDD and to provide the internal logic supply voltage VDD to the logic circuit 400 via the logic supply line 160. The power supply circuit 3200 is configured to regulate the internal logic supply voltage VDD such that the internal logic supply voltage VDD falls within a specified voltage range defined in the vicinity of the typical value of the internal logic supply voltage VDD. In one implementation, the power supply circuit 3200 may be configured to regulate the internal logic supply voltage VDD to fall within a voltage range between the typical value minus 0.10V and the typical value plus 0.10V.

In the shown embodiment, the power supply circuit 3200 includes the first regulator circuit 500A described in relation to FIG. 1, and further includes a second regulator circuit 500C instead of the second regulator circuit 500B shown in FIG. 1. The outputs of the first regulator circuit 500A and the second regulator circuit 500C are commonly coupled to the logic supply line 160, and the first regulator circuit 500A and the second regulator circuit 500C are used to drive the logic supply line 160.

In the embodiment shown in FIG. 6, the second regulator circuit 500C includes a second former stage 510C and a pair of output NMOS transistors MN5 and MN6. The second former stage 510C is configured to receive the analog supply voltage AVDD to drive the gates of the output NMOS transistors MN5 and MN6. The output NMOS transistors MN5 and MN6 form an output stage that drives the output of the second regulator circuit 500C. The output NMOS transistor MN5 has a source coupled to the output of the second regulator circuit 500C and a drain coupled to the Ext_VDD line 180. The output NMOS transistor MN6 has a source coupled to the ground and a drain coupled to the output of the second regulator circuit 500C. The output NMOS transistor MN5 is a pull-up transistor used to pull up the output of the second regulator circuit 500C and the output NMOS transistor MN6 is a pull-down transistor used to pull down the output of the second regulator circuit 500C.

The second regulator circuit 500C is configured to provide sufficient current drive capability even when the external logic supply voltage Ext_VDD is at a reduced voltage level, because the second former stage 510C is powered by the analog supply voltage AVDD and therefore the maximum gate-source voltage of the output NMOS transistor MN5 is AVDD-VDD. It should be noted that the discussion regarding the gate-source voltage of the output NMOS transistor MN3 of the second regulator circuit 500B described in relation to FIG. 2 also applies to the gate-source voltage of the output NMOS transistor MN5 of the second regulator circuit 500C. In one implementation, the second former stage 510C may be configured to receive a reference voltage $V_{REF\_C}$ at the input thereof and adjust the gate voltages of the output NMOS transistors MN5 and the output NMOS transistor MN6 to reduce the difference between the reference voltage $V_{REF\_C}$ and the output voltage of the second regulator circuit 500C.

In one or more embodiments, the second regulator circuit 500C may be configured to primarily drive the internal logic supply voltage VDD during normal operation, while the first regulator circuit 500A may be configured to primarily drive the internal logic supply voltage VDD when the mixed signal circuit 3000 is in the sleep-in state in which the logic supply voltage IOVCC is available but the analog supply AVDD may be unavailable. This may be achieved by setting the reference voltage $V_{REF\_A}$ provided to the first former stage 510A to be slightly lower than the reference voltage $V_{REF\_C}$ provided to the second former stage 510C of the second regulator circuit 500C. In embodiments where the reference voltage $V_{REF\_C}$ is 1.090V, for example, the reference voltage $V_{REF\_A}$ may be set to 1.085V. In one or more embodiments, the difference between the reference voltage $V_{REF\_C}$ and the reference voltage $V_{REF\_A}$ is 0.01V or less. Using the second regulator circuit 500C to primarily drive the internal logic supply voltage VDD during normal operation may be advantageous for reducing the power consumption of the power supply circuit 3200 because the pull up transistor of the second regulator circuit 500C, i.e., the output NMOS transistor MN5, uses the external supply voltage Ext_VDD, which is lower than the logic supply voltage IOVCC, to maintain the internal logic supply voltage VDD.

Figure 7A:
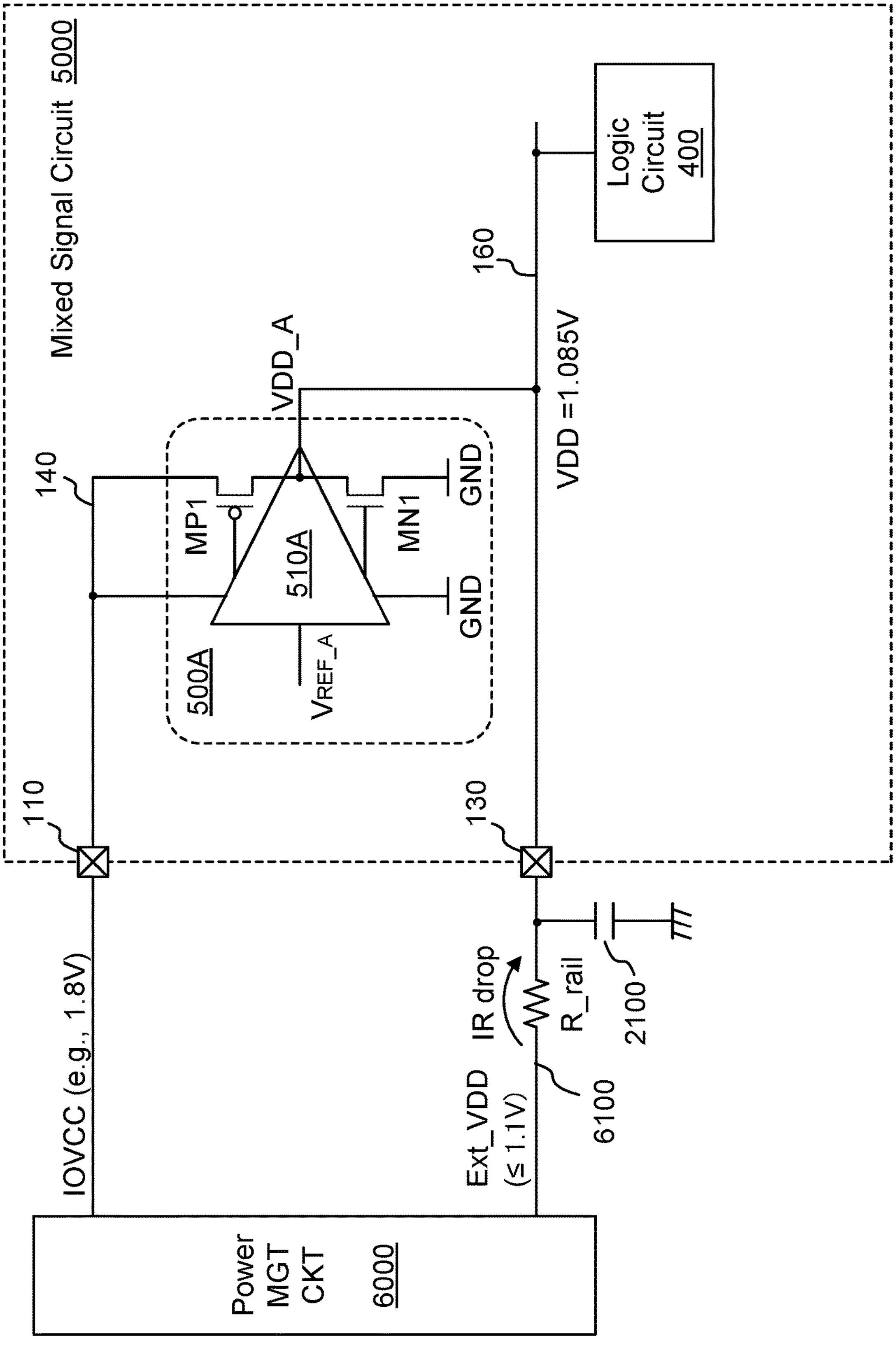
FIG. 7A shows an example of the effect of a voltage drop across a supply line in a system in which a power management circuit provides an external logic supply voltage directly to a logic supply line of a mixed signal circuit.
Figure 7B:
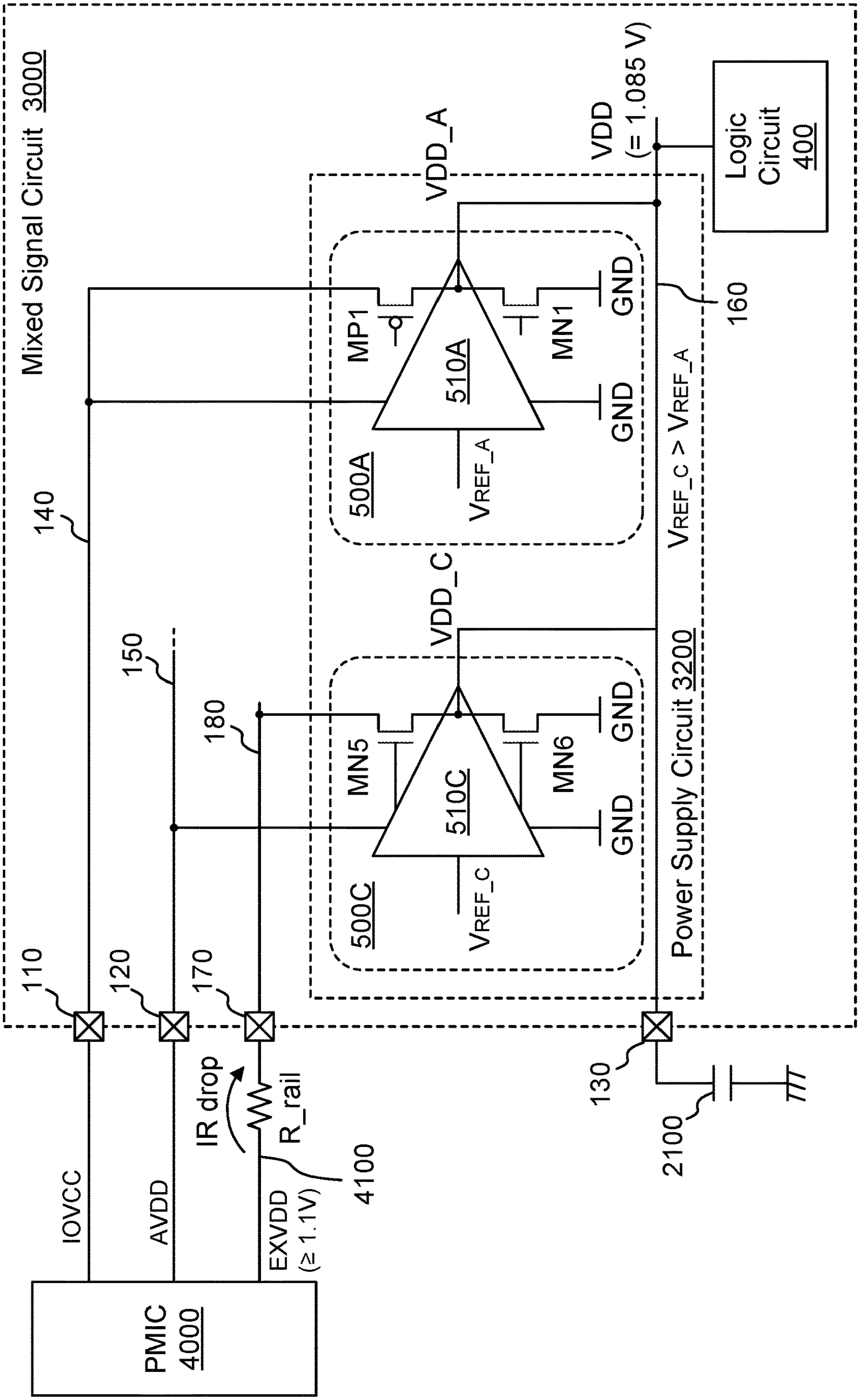
FIG. 7B shows an example of the effect of a voltage drop across a supply line in the system shown in FIG. 6, according to one or more embodiments.

The circuit configuration shown in FIG. 6 may effectively improve the usability of the external logic supply voltage Ext_VDD as discussed below with reference to FIGS. 7A and 7B. FIG. 7A shows an example system configuration in which a power management circuit 6000 provides the external logic supply voltage Ext_VDD directly to the logic supply line 160 of a mixed signal circuit 5000 via a supply line 6100. In this system configuration, the external logic supply voltage Ext_VDD is required to be within the specified voltage range of the internal logic supply voltage VDD. In implementations where the specified voltage range of the internal logic supply voltage VDD is 1.00±0.10V, for example, the external logic supply voltage Ext_VDD is required to be lower than 1.10V. Meanwhile, providing the external logic supply voltage Ext_VDD from the power management circuit 6000 to the mixed signal circuit 5000 via the supply line 6100 may cause a significant voltage drop across the supply line 6100. The voltage drop across the supply line 6100, which depends on the current consumption of the logic circuit 400, may make it difficult for the power management circuit 6000 to appropriately adjust the external logic supply voltage Ext_VDD to ensure that the internal logic supply voltage VDD provided to the logic circuit 400 is within the specified voltage range. In contrast, the use of the second regulator circuit 500C to provide the internal logic supply voltage VDD to the logic circuit 400 as shown in FIG. 7B effectively facilitates the adjustment of the external logic supply voltage Ext_VDD, because the internal logic supply voltage VDD provided to the logic circuit 400 is not affected by the voltage drop across the supply line 4100 that provides the external logic supply voltage Ext_VDD from the power management circuit 4000 to the mixed signal circuit 3000.

Figure 8:
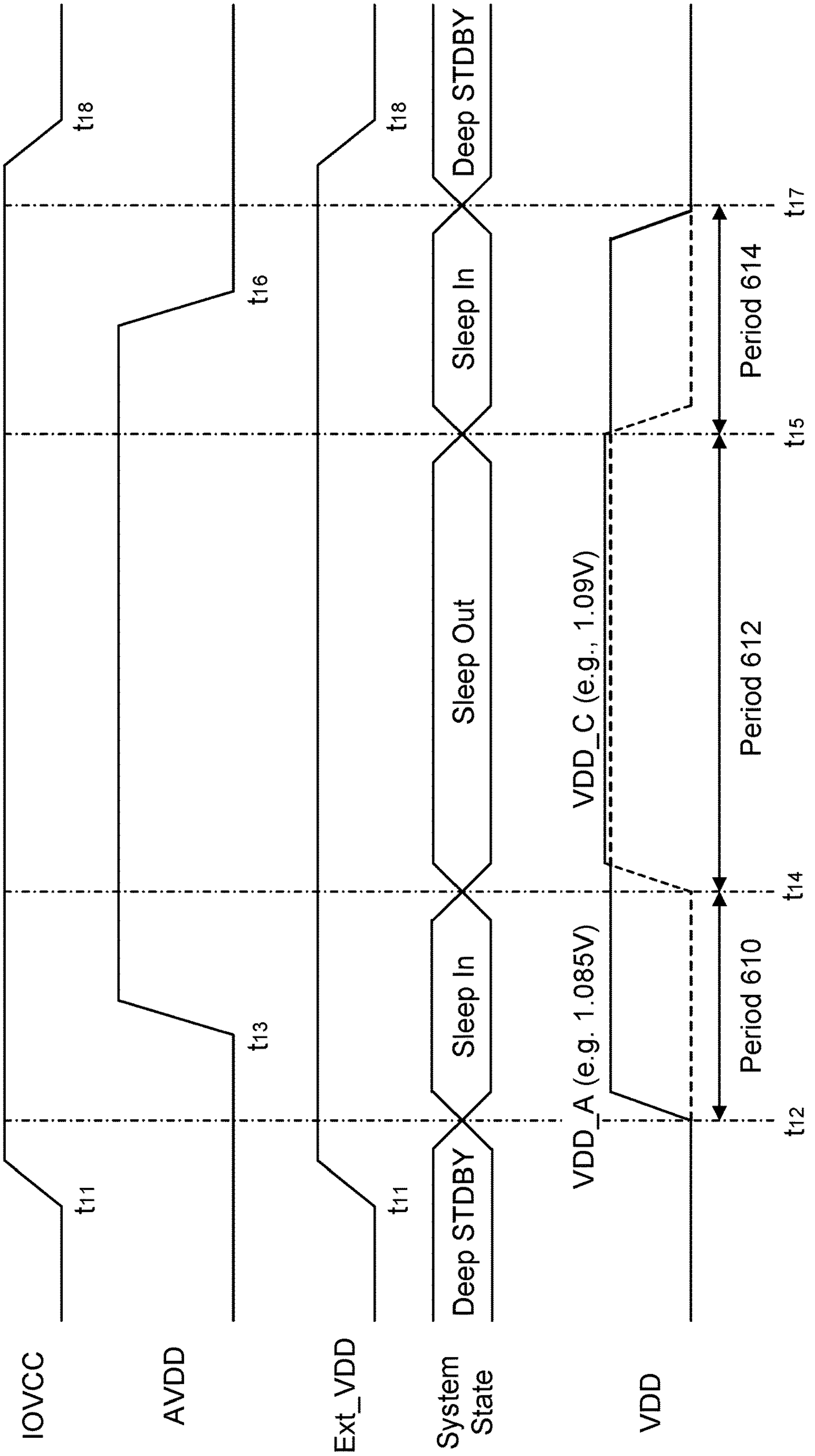
FIG. 8 shows an example of a timing diagram corresponding to operation of the system shown in FIG. 6, according to one or more embodiments.

FIG. 8 shows an example of a timing diagram corresponding to operation of the system shown in FIG. 6, according to one or more embodiments. The operation of the system shown in FIG. 6 is similar to the operation of the system shown in FIG. 1 except that the second regulator circuit 500C (not the first regulator circuit 500A) primarily drives the internal logic supply voltage VDD when the mixed signal circuit 3000 is in the sleep-out state.

Initially (e.g., $t<t_{11}$), the mixed signal circuit 3000 is in a "deep standby (STDBY)" state. Prior to time $t_{11}$, the power management circuit 4000 is not operating and does not provide any of the logic supply voltage IOVCC, the analog supply voltage AVDD, and the external logic supply voltage Ext_VDD. At time $t_{11}$, the power management circuit 4000 begins to drive the logic supply voltage IOVCC and the external logic supply voltage Ext_VDD to provide the logic supply voltage IOVCC and the external logic supply voltage Ext_VDD to the mixed signal circuit 3000.

At time $t_{12}$, the mixed signal circuit 3000 exits the deep standby state and enters a "sleep-in" state to perform a startup sequence. In response to the mixed signal circuit 3000 entering the sleep-in state, the first regulator circuit 500A of the power supply circuit 3200 is activated and begins to drive the internal logic supply voltage VDD to the reference voltage $V_{REF\_A}$, e.g., 1.085V. This allows the logic circuit 400 to perform the startup sequence. It should be noted that the second regulator circuit 500C and the analog circuit 300 remain deactivated while the mixed signal circuit 3000 is in the sleep-in state. During the period 610 during which the mixed signal circuit 3000 is in the sleep-in state, the first regulator circuit 500A of the power supply circuit 3200 remains activated and the internal logic supply voltage VDD is driven only by the first regulator circuit 500A.

In the shown embodiment, the power management circuit 4000 begins to drive the analog supply voltage AVDD to the specified level (e.g., 5.0V) at time $t_{13}$ after the mixed signal circuit 3000 enters the sleep-in state at time $t_{12}$. In alternative embodiments, the power management circuit 4000 begins to drive the analog supply voltage AVDD before the mixed signal circuit 3000 enters the sleep-in state after beginning to drive the internal logic supply voltage VDD.

At time $t_{14}$, the mixed signal circuit 3000 enters a "sleep-out" state in which both the analog circuit 300 and the logic circuit 400 perform normal operation. In response to the mixed signal circuit 3000 entering the sleep-out state, the second regulator circuit 500C of the power supply circuit 3200 begins to drive the internal logic supply voltage VDD to the reference voltage $V_{REF\_C}$, e.g., 1.09V. During the period 612 during which the mixed signal circuit 3000 is in the sleep-out state, both the first regulator circuit 500A and the second regulator circuit 500C remain activated to drive the internal logic supply voltage VDD. However, since the reference voltage $V_{REF\_A}$ provided to the first regulator circuit 500A is slightly lower than the reference voltage $V_{REF\_C}$ provided to the second regulator circuit 500C, the second regulator circuit 500C primarily drives the internal logic supply voltage VDD during the period 612, and the first regulator circuit 500A drives the internal logic supply voltage VDD only when the internal logic supply voltage VDD falls below the reference voltage $V_{REF\_A}$, for example, due to an increase in power or current consumption of the logic circuit 400.

At time tis, the mixed signal circuit 3000 enters the sleep-in state to perform a shutdown sequence. In response to the mixed signal circuit 3000 entering the sleep-in state, the analog circuit 300 and the second regulator circuit 500C of the power supply circuit 3200 are deactivated and the second regulator circuit 500C stops driving the internal logic supply voltage VDD. It should be noted that the first regulator circuit 500A remains activated to perform the shutdown sequence while the mixed signal circuit 3000 is in the sleep-in state. At time $t_{16}$, the power management circuit 4000 stops driving the analog supply voltage AVDD after the mixed signal circuit 3000 enters the sleep-in state at time $t_{15}$.

At time $t_{17}$, the mixed signal circuit 3000 enters the deep standby state. In response to the mixed signal circuit 3000 entering the deep standby state, the first regulator circuit 500A of the power supply circuit 3200 stops driving the internal logic supply voltage VDD. The power management circuit 4000 may then stop driving the logic supply voltage IOVCC and the external logic supply voltage Ext_VDD at time $t_{18}$. In alternative embodiments, the power management circuit 4000 may stop driving the analog supply voltage AVDD after the mixed signal circuit 3000 enters the deep standby state.

Figure 9:
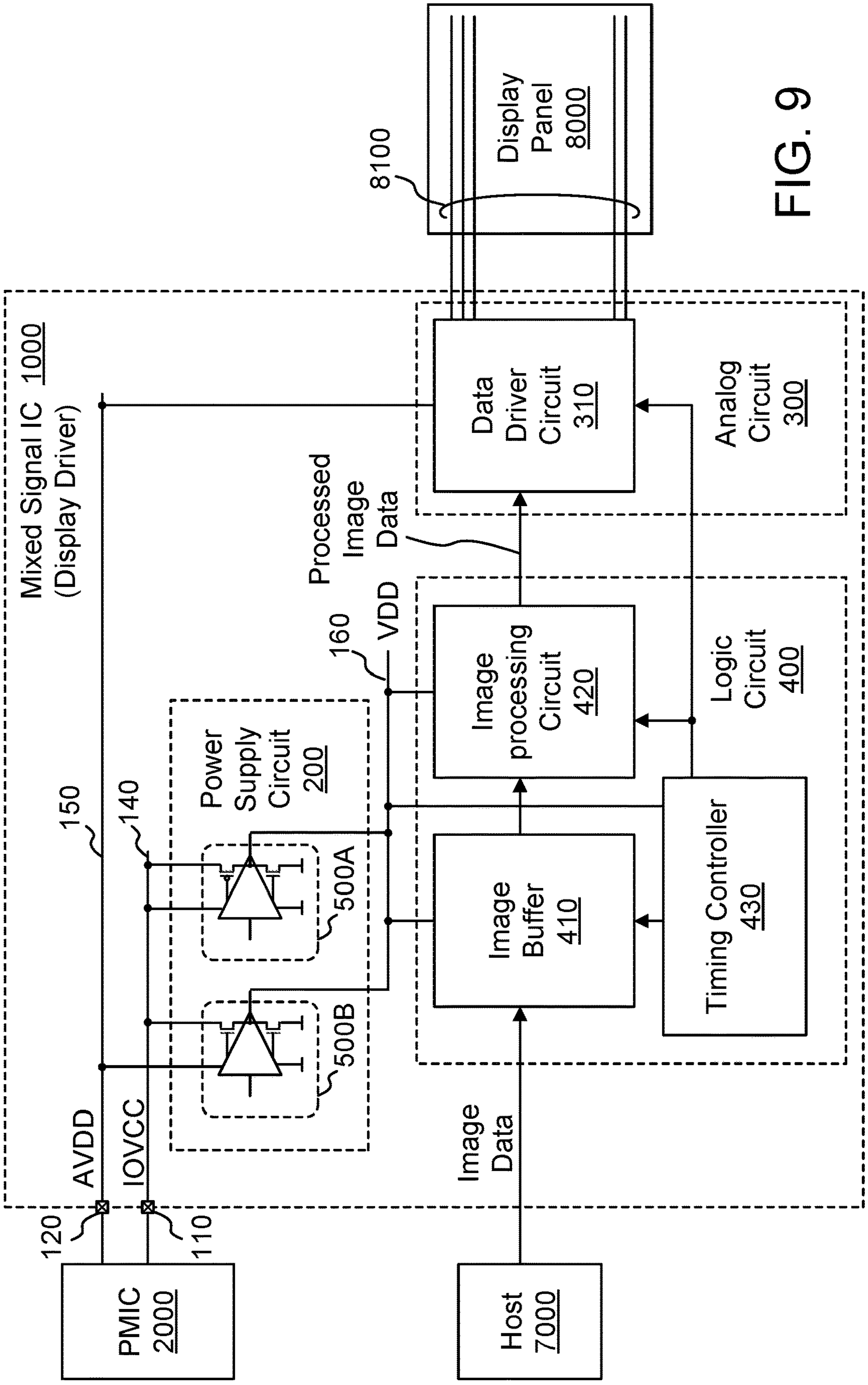
FIG. 9 shows example configurations of an analog circuit and a logic circuit, according to one or more embodiments.

FIG. 9 shows example configurations of the analog circuit 300 and the logic circuit 400, according to one or more embodiments. In the shown embodiment, the mixed signal circuit 1000 is configured as a display driver that drives a display panel 8000 based on image data received from a host 7000. The display panel 8000 may be an LCD panel, an OLED display panel, a μLED display panel, or another type of display panel. In one or more embodiments, the logic circuit 400 includes an image buffer 410, an image processing circuit 420, and a timing controller 430, which are all configured to receive the internal logic supply voltage VDD. The image buffer 410 is configured to store therein the image data received from the host 7000 and forward the stored image data to the image processing circuit 420. The image processing circuit 420 is configured to process the image data to generate processed image data. The timing controller 430 is configured to provide timing control for the mixed signal circuit 1000. The analog circuit 300 includes a data driver circuit 310 configured to receive the analog supply voltage AVDD. The data driver circuit 310 is configured to receive the processed image data from the image processing circuit 420 and to drive data lines (also referred to as source lines) 8100 of the display panel 8000 using the analog supply voltage AVDD based on the processed image data. While FIG. 9 show an embodiment where the analog circuit 300 and the logic circuit 400 are integrated within the mixed signal circuit 1000 shown in FIG. 1, the configurations of the analog circuit 300 and the logic circuit 400 shown in FIG. 9 may also be used in the mixed signal circuit 3000 shown in FIG. 6.

Figure 10:
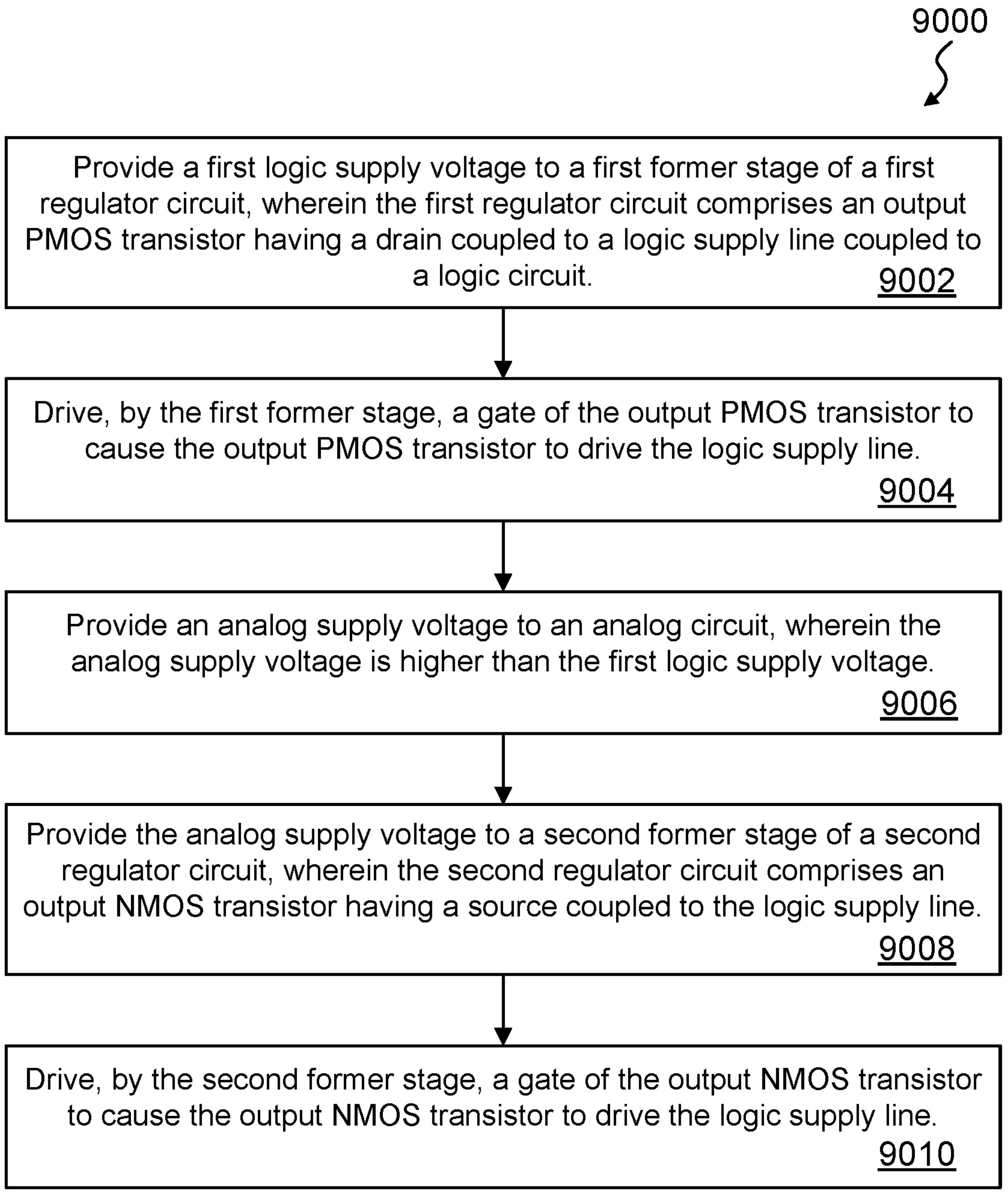
FIG. 10 is a flowchart of an exemplary method of operating a mixed signal circuit, according to one or more embodiments.

FIG. 10 is a flowchart of an exemplary method 9000 of operating a mixed signal circuit, according to one or more embodiments. The method 9000, for example, may be performed by the system shown in FIG. 1 or FIG. 6, more specifically, the mixed signal circuit 1000 shown in FIG. 1 and the mixed signal circuit 3000 shown in FIG. 6. However, it will be recognized that a mixed signal circuit that includes additional and/or fewer components as shown in FIG. 1 or 6 may be used to perform the method 9000, that, except where otherwise apparent, any of the following steps may be performed in any suitable order, and that the method 9000 may be performed in any suitable environment.

The method 9000 includes providing a first logic supply voltage (e.g., the logic supply voltage IOVCC shown in FIGS. 1 and 6) to a first former stage (e.g., the first former stage 510A) of a first regulator circuit (e.g., the first regulator circuit 500A) in step 9002. The first regulator circuit includes an output PMOS transistor (e.g., the output PMOS transistor MP1) having a drain coupled to a logic supply line (e.g., the logic supply line 160) coupled to a logic circuit (e.g., the logic circuit 400). The first logic supply voltage may be provided to the mixed signal circuit from a source external to the mixed signal circuit. In one implementation, the first logic supply voltage may also be provided to the source of the output PMOS transistor. The method 9000 further includes driving, by the first former stage in step 9004, a gate of the output PMOS transistor to cause the output PMOS transistor to drive the logic supply line.

The method 9000 further includes providing an analog supply voltage (e.g., the analog supply voltage AVDD) to an analog circuit (e.g., the analog circuit 300) in step 9006. The method 9000 further includes providing the analog supply voltage to a second former stage (e.g., the second former stages 510B and 510C shown in FIGS. 1 and 6) of a second regulator circuit (e.g., the second regulator circuits 500B and 500C) in step 9008. The second regulator circuit includes an output NMOS transistor (e.g., the output NMOS transistors MN3 and MN5) having a source coupled to the logic supply line. In some implementations, the first logic supply voltage may also be provided to the drain of the output NMOS transistor of the second regulator circuit. In other implementations, a second logic supply voltage (e.g., the external logic supply voltage Ext_VDD) that is lower than the first logic supply voltage may be provided to the drain of the output NMOS transistor of the second regulator circuit. The method 9000 further includes driving, by the second former stage in step 9010, a gate of the output NMOS transistor to cause the output NMOS transistor to drive the logic supply line.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A mixed signal circuit comprising:
- a logic circuit;
- an analog circuit configured to receive an analog supply voltage;
- a logic supply line coupled to the logic circuit;
- a first regulator circuit comprising:
  - an output p-channel metal oxide semiconductor (PMOS) transistor having a drain coupled to the logic supply line; and
  - a first former stage configured to receive a first logic supply voltage to drive a gate of the output PMOS transistor; and
- a second regulator circuit comprising:
  - an output n-channel metal oxide semiconductor (NMOS) transistor having a source coupled to the logic supply line; and
  - a second former stage configured to receive the analog supply voltage to drive a gate of the output NMOS transistor,
- wherein the analog supply voltage is higher than the first logic supply voltage.

2. The mixed signal circuit of claim 1, wherein the first logic supply voltage is supplied to the mixed signal circuit from a source external to the mixed signal circuit.

3. The mixed signal circuit of claim 1, wherein the output PMOS transistor of the first regulator circuit has a source configured to receive the first logic supply voltage, and wherein the output NMOS transistor of the second regulator circuit has a drain configured to receive the first logic supply voltage.

4. The mixed signal circuit of claim 3, wherein the first regulator circuit is configured to:

receive a first reference voltage at an input of the first former stage; and drive an output of the first regulator circuit based on the first reference voltage, wherein the second regulator circuit is configured to:

receive a second reference voltage at an input of the second former stage, the second reference voltage is lower than the first reference voltage; and drive an output of the second regulator circuit based on the second reference voltage.

5. The mixed signal circuit of claim 4, wherein a difference between the first reference voltage and the second reference voltage is 0.01V or less.

6. The mixed signal circuit of claim 1, wherein the output PMOS transistor of the first regulator circuit has a source configured to receive the first logic supply voltage, wherein the output NMOS transistor of the second regulator circuit has a drain configured to receive a second logic supply voltage, wherein the second logic supply voltage is lower than the first logic supply voltage, and wherein the first logic supply voltage and the second logic supply voltage are provided to the mixed signal circuit from a source external to the mixed signal circuit.

7. The mixed signal circuit of claim 6, wherein the first regulator circuit is configured to:

receive a first reference voltage at an input of the first former stage; and drive an output of the first regulator circuit based on the first reference voltage, and wherein the second regulator circuit is configured to:

receive a second reference voltage at an input of the second former stage, the second reference voltage is higher than the first reference voltage; and drive an output of the second regulator circuit based on the second reference voltage.

8. The mixed signal circuit of claim 7, wherein a difference between the second reference voltage and the first reference voltage is 0.01V or less.

9. The mixed signal circuit of claim 1, wherein the first regulator circuit is activated during a first period that occurs after the mixed signal circuit exits a deep standby state, wherein the second regulator circuit is deactivated during the first period, and wherein the first regulator circuit and the second regulator circuit are both activated during a second period that follows the first period.

10. The mixed signal circuit of claim 9, wherein the analog supply voltage starts to be provided to the mixed signal circuit at an instance of time within the second period.

11. The mixed signal circuit of claim 1, wherein the analog circuit comprises a data driver circuit configured to drive data lines of a display panel.

12. A system comprising:

a power management circuit configured to generate a first logic supply voltage and an analog supply voltage, wherein the analog supply voltage is higher than the first logic supply voltage; and a mixed signal circuit comprising:

a logic circuit;

an analog circuit configured to receive the analog supply voltage;

a logic supply line coupled to the logic circuit;

a first regulator circuit comprising:

an output p-channel metal oxide semiconductor (PMOS) transistor having a drain coupled to the logic supply line;

a first former stage configured to receive the first logic supply voltage to drive a gate of the output PMOS transistor; and a second regulator circuit comprising:

an output n-channel metal oxide semiconductor (NMOS) transistor having a source coupled to the logic supply line; and a second former stage configured to receive the analog supply voltage to drive a gate of the output NMOS transistor.

13. The system of claim 12, wherein the output PMOS transistor of the first regulator circuit has a source configured to receive the first logic supply voltage, and wherein the output NMOS transistor of the second regulator circuit has a drain configured to receive the first logic supply voltage.

14. The system of claim 13, wherein the first regulator circuit is configured to:

receive a first reference voltage at an input of the first former stage; and drive an output of the first regulator circuit based on the first reference voltage, and wherein the second regulator circuit is configured to:

receive a second reference voltage at an input of the second former stage, the second reference voltage is lower than the first reference voltage; and drive an output of the second regulator circuit based on the second reference voltage.

15. The system of claim 12, wherein the power management circuit is further configured to generate a second logic supply voltage lower than the first logic supply voltage, wherein the output PMOS transistor of the first regulator circuit has a source configured to receive the first logic supply voltage, wherein the output NMOS transistor of the second regulator circuit has a drain configured to receive the second logic supply voltage.

16. The system of claim 15, wherein the first regulator circuit is configured to:

receive a first reference voltage at an input of the first former stage; and drive an output of the first regulator circuit based on the first reference voltage, and wherein the second regulator circuit is configured to:

receive a second reference voltage at an input of the second former stage, the second reference voltage is higher than the first reference voltage; and drive the output of the second regulator circuit based on the second reference voltage.

17. A method, comprising:

providing a first logic supply voltage to a first former stage of a first regulator circuit, wherein the first regulator circuit comprises an output p-channel metal oxide semiconductor (PMOS) transistor having a drain coupled to a logic supply line coupled to a logic circuit;

driving, by the first former stage, a gate of the output PMOS transistor to cause the output PMOS transistor to drive the logic supply line;

providing an analog supply voltage to an analog circuit, wherein the analog supply voltage is higher than the first logic supply voltage;

providing the analog supply voltage to a second former stage of a second regulator circuit, wherein the second regulator circuit comprises an output n-channel metal oxide semiconductor (NMOS) transistor having a source coupled to the logic supply line; and driving, by the second former stage, a gate of the output NMOS transistor to cause the output NMOS transistor to drive the logic supply line.

18. The method of claim 17, further comprising:

providing the first logic supply voltage to a source of the output PMOS transistor; and providing the first logic supply voltage to a drain of the output NMOS transistor.

19. The method of claim 17, further comprising:

providing the first logic supply voltage to a source of the output PMOS transistor; and providing a second logic supply voltage to a drain of the output NMOS transistor, wherein the second logic supply voltage is lower than the first logic supply voltage.

20. The method of claim 19, wherein the first logic supply voltage and the second logic supply voltage are generated by a power management circuit external to a mixed signal circuit that comprises the first regulator circuit, the second regulator circuit, the logic supply line, the logic circuit, and the analog circuit.

* * * * *